US012113436B2

(12) United States Patent
Ohtake et al.

(10) Patent No.: US 12,113,436 B2
(45) Date of Patent: Oct. 8, 2024

(54) INTEGRATED CIRCUIT AND METHOD OF SYNCHRONOUS RECTIFICATION CONTROL OF BRIDGELESS POWER FACTOR CORRECTION CIRCUIT

(71) Applicant: SANKEN ELECTRIC CO., LTD., Niiza (JP)

(72) Inventors: Osamu Ohtake, Niiza (JP); Ryuichi Furukoshi, Niiza (JP)

(73) Assignee: SANKEN ELECTRIC CO., LTD., Niiza (JP)

( * ) Notice: Subject to any disclaimer, the term of this patent is extended or adjusted under 35 U.S.C. 154(b) by 341 days.

(21) Appl. No.: 17/677,709

(22) Filed: Feb. 22, 2022

(65) Prior Publication Data

US 2022/0271654 A1     Aug. 25, 2022

(30) Foreign Application Priority Data

Feb. 25, 2021     (JP) ................................ 2021-028436

(51) Int. Cl.
*H02M 1/42*     (2007.01)
*H02M 1/00*     (2006.01)

(52) U.S. Cl.
CPC ........ *H02M 1/4233* (2013.01); *H02M 1/0058* (2021.05); *H02M 1/0085* (2021.05)

(58) Field of Classification Search
CPC ............................................ H02M 1/42–4291
See application file for complete search history.

(56) References Cited

U.S. PATENT DOCUMENTS

| 2014/0002033 | A1 | 1/2014 | Chen et al. | |
| 2019/0097526 | A1* | 3/2019 | Ikarashi | .............. H02M 1/4208 |
| 2019/0319528 | A1* | 10/2019 | Matsuura | .............. H02M 1/083 |

FOREIGN PATENT DOCUMENTS

| JP | 2004-222367 A | 8/2004 |
| JP | 6529045 B2 | 6/2019 |
| JP | 2019-187104 A | 10/2019 |

OTHER PUBLICATIONS

Office Action (Decision to Grant a Patent) issued on Jun. 18, 2024 in counterpart Japanese patent application No. 2021-028436.
Office Action mailed on Mar. 19, 2024 in a counterpart Japanese patent application.

* cited by examiner

*Primary Examiner* — Peter M Novak
(74) *Attorney, Agent, or Firm* — METROLEX IP LAW GROUP, PLLC; Robert L. Scott, Esq

(57) ABSTRACT

A method may include detecting an output voltage of the output smoothing capacitor in the bridgeless interleaved power factor correction circuit of a critical mode, comparing the detected output voltage with a reference voltage, controlling the first and the second half-bridge circuits included in the bridgeless interleaved power factor correction circuit of the critical mode to be on and off based on an error signal between the output voltage and the predetermined reference voltage, measuring ON time of a synchronous rectification switch operation of the first half-bridge circuit by measuring a time period between OFF timing of an active switch of the first half-bridge circuit and output of a differentiation signal generated by a differentiation circuit included in the bridgeless interleaved power factor correction circuit of the critical mode; and assigning the measured time to next ON time of the synchronous rectification switch operation of the second half-bridge circuit.

7 Claims, 8 Drawing Sheets

INTEGRATED CIRCUIT AND METHOD OF SYNCHRONOUS RECTIFICATION CONTROL OF BRIDGELESS POWER FACTOR CORRECTION CIRCUIT

CROSS REFERENCE TO RELATED APPLICATIONS

This application claims priority based on 35 USC 119 from prior Japanese Patent Application No. 2021-028436 filed with the Japan Patent Office on Feb. 25, 2021, the entire contents of which are incorporated herein by reference.

BACKGROUND

This disclosure is related to a series circuit of a reactor and a switch element to which an input voltage is applied, and to a bridgeless power factor correction circuit that includes a synchronous rectification element connected to a connection point between a reactor and a switch element to convert an input voltage to an output voltage to output.

Home appliances, which includes display devices, such as LCD TVs and OLED TVs, use power factor correction (PFC) circuits and DC/DC converters to generate a stable output voltage from an AC power supply. In particular, a bridgeless PFC is used in a power factor correction circuit because of its high efficiency and compact size. The PFC needs to have high efficiency and low noise. As illustrated in FIGS. 8 and 9, a control circuit of a bridgeless PFC, which consists of a circuit intended for zero-voltage switching control, is disclosed in JP6529045 (Patent Document 1).

Patent document 1, illustrated in FIG. 8, is a totem pole PFC circuit that operates with critical mode switching. In this circuit, one switch operates as an active switch that forms a primary current path with a diode or a return circuit MOSFET, and a second totem pole switch operates as freewheeling or synchronous rectification switches. The roles of the active switch and the synchronous rectification switch are to change an input voltage switch between positive and negative poles each time. However, when a device voltage of the active switch is greater than zero, the active switch operation results in a switching loss. Also, when an additional conduction loss is allowed due to the delay of the timing to switch the active switch while the device voltage of the active switch is negative, the efficiency is reduced by a non-zero switch of the active switch.

Therefore, according to a control method, a bridgeless totem pole power factor correction converter is provided to promote zero-voltage switching of the active switch. The time when the synchronous rectification switch is ON following the equilibrium relation of voltage of an absolute valuextime for each switching cycle is determined and is selectively adjusted or offset based on the voltage at both ends of the active switch for the next switching cycle. As illustrated in FIGS. 9A and 9B, the period of time when the synchronous rectification switch is ON is increased when the active switch voltage exceeds the threshold, and is decreased during the next switching cycle when the active switch voltage is negative. As illustrated in FIGS. 9A and 9B, the control device and method of Patent Document 1 delay the time of which the synchronous rectification switch is ON when the device voltage exceeds the predetermined threshold voltage, which is greater than zero, and selectively reduce the time of which the synchronous rectification switch is ON until the active switch voltage returns from negative to zero so that the switching has zero current. When the device voltage of the active switch is between zero and the predetermined threshold voltage, the time when the synchronous rectification switch is ON is not adjusted.

In Patent Document 1, the circuit determines whether the device voltage of the active switch is higher than the predetermined threshold or lower than 0V twice per switching to facilitate active switch to be zero voltage switching. Based on the result, the offset time for the next ON time of the synchronous rectification switch is selected. However, a control circuit to conduct the determination twice per switching and select the device voltage of the active switch based on the two thresholds, e.g., the processing ability of a CPU, needs to be high performance and expensive with fast processing performance. Especially for an interleaved power factor correction circuit, which is advantageous for high-power and low-profile packaging, such as a large LCD/OLED TV, two of the above-mentioned detection operations and control circuits are required, which causes a lot of costs.

As a simple method, it is possible to make the active switch on/off only by the ON time of the next cycle based on the above-mentioned calculation without detecting the near-zero device voltage of the active switch by sacrificing some loss of the active switch. However, since the traditional method of detecting input/output voltage is to reduce circuit loss by making the voltage detection circuit high-impedance, the method is susceptible to noise. For example, as illustrated in FIG. 4, the active switch normally turns off at a time A (period a), but the active switch malfunctions and turns off at a time D (period d) by the influence of noise, which causes a lot of current flows of the negative current of a reactor current IL current and increasing a loss of the synchronous rectification switch. The negative current is regenerated from an output smoothing capacitor to the AC power supply side, and more power including the regenerated power needs to be supplied to the output side in the next switching. Therefore, the power factor correction circuit loss is further increased, and in the worst case, the active switch, synchronous rectification switch, etc. may be damaged.

SUMMARY

An integrated circuit that performs synchronous rectification control of a bridgeless power factor correction circuit in a critical mode according to one or more embodiments may include: a bridgeless power factor correction circuit of a critical mode including: a first diode; a second diode electrically connected in series with the first diode; an output smoothing capacitor electrically connected to the first diode and the second diode; an AC power supply that includes a first terminal and a second terminal and is electrically connected to the first diode and the second diode; a first reactor that includes a first terminal and a second terminal and is connected to the second terminal of the AC power supply; a half-bridge circuit including a first NMOSFET and a second NMOSFET, the second terminal of the reactor electrically connected to a connection point between the first NMOSFET and the second NMOSFET; and a differentiation circuit that includes a capacitor and a resistor and is connected between main electrodes of the second NMOSFET in the half-bridge circuit. In an integrated circuit according to one or more embodiment, an integrated circuit may detect an output voltage of the output smoothing capacitor, compares the output voltage with a reference voltage, and controls the half-bridge circuit to be on and off based on an error signal between the output voltage and the reference voltage, and the next ON time of a synchronous rectification switch operation of the half-bridge circuit may be assigned based on time that subtracting a predetermined time from a measured time, which is measured a period between OFF timing of an active switch of the half-bridge circuit and output of a differentiation signal generated by the differentiation circuit.

An integrated circuit that performs synchronous rectification control of a bridgeless interleaved power factor correction circuit in a critical mode according to one or more embodiments may include: a bridgeless interleaved power factor correction circuit of a critical mode including: a first diode; a second diode electrically connected in series with the first diode; an output smoothing capacitor electrically connected to the first diode and the second diode; an AC power supply that includes a first terminal and a second terminal and is electrically connected to the first diode and the second diode; a first reactor that includes a first terminal and a second terminal and is connected to the second terminal of the AC power supply; a second reactor that includes a first terminal and a second terminal, is connected to the second terminal of the AC power supply, and is connected in parallel with the first reactor; a first half-bridge circuit including a first NMOSFET and a second NMOSFET on a master side, wherein the second terminal of the first reactor is electrically connected to a connection point between the first NMOSFET and the second NMOSFET; a second half-bridge circuit including a third NMOSFET and a fourth NMOSFET on a slave side, wherein the second terminal of the second reactor is electrically connected to a connection point between the third NMOSFET and the fourth NMOSFET; and a differentiation circuit that includes a capacitor and a resistor and is connected between main electrodes of the second NMOSFET of the first half-bridge circuit. In one or more embodiments, an integrated circuit may detect an output voltage of the output smoothing capacitor, compares the output voltage with a predetermined reference voltage, and controls the first half-bridge circuit and the second half-bridge circuit to be on and off based on an error signal between the output voltage and the predetermined reference voltage, the ON time of a synchronous rectification switch operation of the first half-bridge circuit may be assigned to the next ON time of the synchronous rectification switch operation of the second half-bridge circuit by measuring a period between OFF timing of an active switch of the first half-bridge circuit and output of a differentiation signal generated by the differentiation circuit.

An integrated circuit for synchronous rectification control of a bridgeless interleaved power factor correction circuit in a critical mode according to one or more embodiments may include: a bridgeless interleaved power factor correction circuit of a critical mode including: an AC power supply including a first terminal and a second terminal; an output smoothing capacitor connected in parallel with the AC power supply; a first reactor that includes a first terminal and a second terminal and is connected to the second terminal of the AC power supply; a second reactor that includes a first terminal and a second terminal, is connected to the second terminal of the AC power supply, and is connected in parallel with the first reactor; a first half-bridge circuit including a first NMOSFET and a second NMOSFET on a master side, wherein the second terminal of the first reactor is electrically connected to the connection point between the first NMOSFET and the second NMOSFET; a second half-bridge circuit including a third NMOSFET and a fourth NMOSFET on a slave side, wherein the second terminal of the second reactor is electrically connected to a connection point between the third NMOSFET and the fourth NMOSFET; and a differentiation circuit that includes a capacitor and a resistor and is connected between main electrodes of the second NMOSFET of the first half-bridge circuit. In one or more embodiments, an integrated circuit may detect an output voltage of the output smoothing capacitor, may compare the output voltage with a predetermined reference voltage, and may control the first half-bridge circuit and the second half-bridge circuit to be on and off based on an error signal between the output voltage and the predetermined reference voltage. In one or more embodiments, an ON time of a synchronous rectification switch operation of the first half-bridge circuit may be assigned to the next ON time of the synchronous rectification switch operation of the second half-bridge circuit by measuring a period between OFF timing of an active switch of the first half-bridge circuit and output of a differentiation signal generated by the differentiation circuit.

A method of performing synchronous rectification control of a bridgeless interleaved power factor correction circuit of a critical mode according to one or more embodiments may include: detecting an output voltage of the output smoothing capacitor in the bridgeless interleaved power factor correction circuit of the critical mode; comparing of the detected output voltage with a predetermined reference voltage; controlling the first half-bridge circuit and the second half-bridge circuit included in the bridgeless interleaved power factor correction circuit of the critical mode to be on and off based on an error signal between the output voltage and the predetermined reference voltage; measuring the ON time of a synchronous rectification switch operation of the first half-bridge circuit by measuring a time period between OFF timing of an active switch of the first half-bridge circuit and outputting a differentiation signal generated by a differentiation circuit included in the bridgeless interleaved power factor correction circuit of the critical mode; and assigning the measured time to the next ON time of the synchronous rectification switch operation of the second half-bridge circuit.

DETAILED DESCRIPTION

Figure 1:
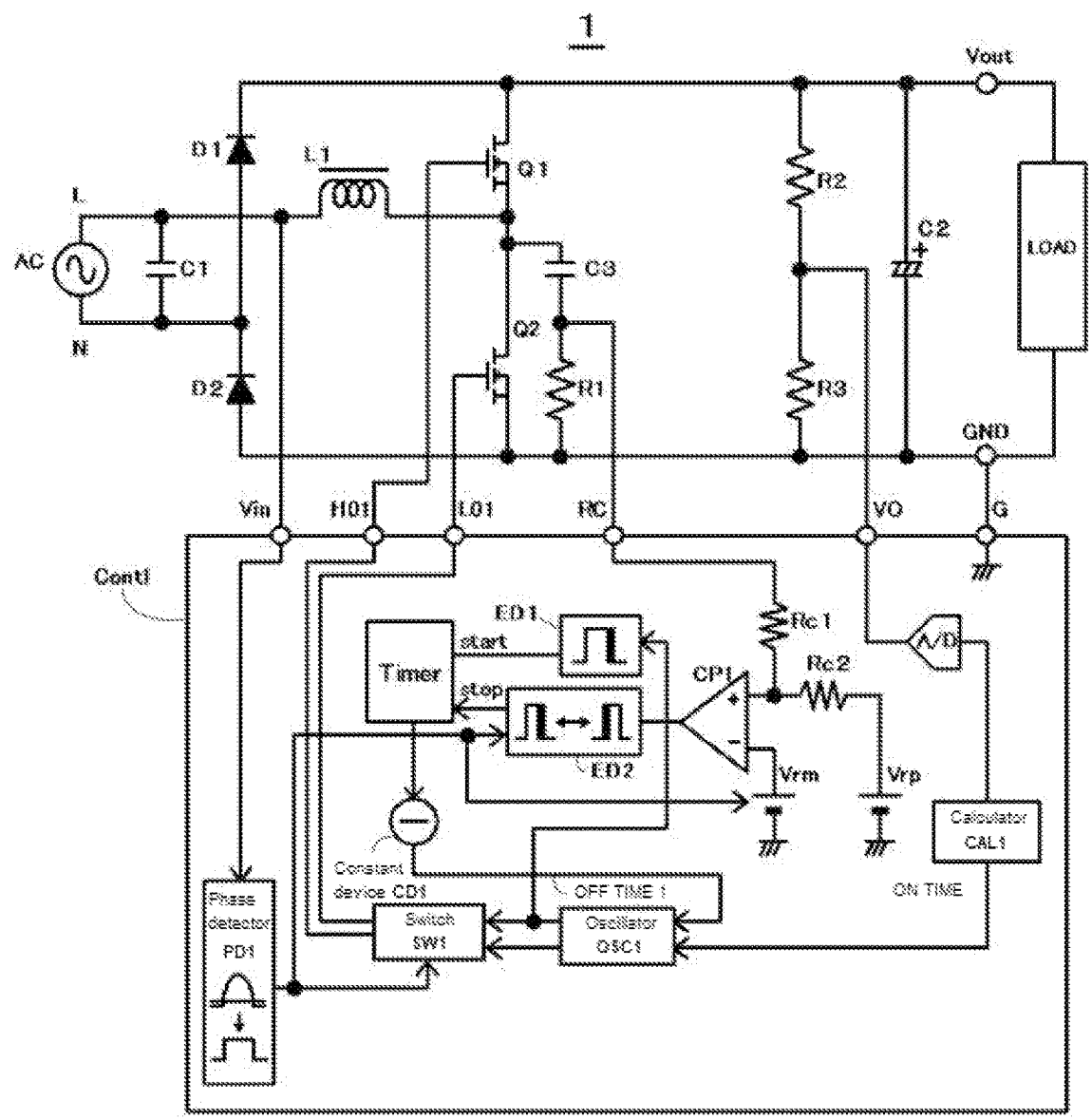
FIG. 1 is a configuration diagram illustrating a bridgeless power factor correction circuit according to an Embodiment 1.

Embodiments are described with referring to drawings. In the respective drawings referenced herein, the same constituents are designated by the same reference numerals and duplicate explanation concerning the same constituents may be omitted. All of the drawings are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationships and ratios are different from one drawing to another.

Embodiment 1

FIG. 1 is a diagram illustrating a bridgeless power factor correction circuit of a critical mode according to Embodiment 1. In FIG. 1, a bridgeless power factor correction circuit comprises a diode D1, a diode D2, a first reactor L1, an N-channel MOSFET Q1, an N-channel MOSFET Q2, a resistor R1 and a capacitor C3 that forms a differentiation circuit, an output smoothing capacitor C2, an output voltage detecting resistor R2, an output voltage detecting resistor R3, and an integrated circuit Cont1 including a circuit with various functions. In a bridgeless power factor correction circuit 1 according to one or more embodiments, a capacitor C1 is connected between both ends of an L terminal and an N terminal of an AC power supply AC for noise reduction, and the first reactor L1 is connected on the L terminal side. A connection point of a series circuit of the diodes D1 and D2 is connected to the N terminal side of the AC power supply AC, a cathode of the diode D1 is connected to a positive pole of an output voltage, and an anode of the diode D2 is connected to a negative pole of the output voltage, i.e., GND. A half bridge circuit of N-channel MOSFETs Q1 and Q2 and a series circuit including resistors R2 and R3 for detecting the output voltage are connected between both terminals of the series circuit of the diodes D1 and D2. The other terminal of the first reactor L1 is connected to the connection point between the N-channel MOSFETs Q1 and Q2. The capacitor C3 and the resistor R1 of the differentiation circuit are connected between the connection point of the N-channel MOSFETs Q1 and Q2 and the anode of the diode D2, which is the GND.

In the integrated circuit Cont1, the L terminal of the AC power supply AC is connected to a Vin terminal, gate terminals of the N-channel MOSFETs Q1 and Q2 are connected to an H01 terminal and an L01 terminal, respectively, the connection point between the capacitor C3 and the resistor R1 of the differentiation circuit is connected to an RC terminal, and the connection point between the resistors R2 and R3 of the series circuit for detecting the output voltage is connected to a VO terminal.

Figure 2:
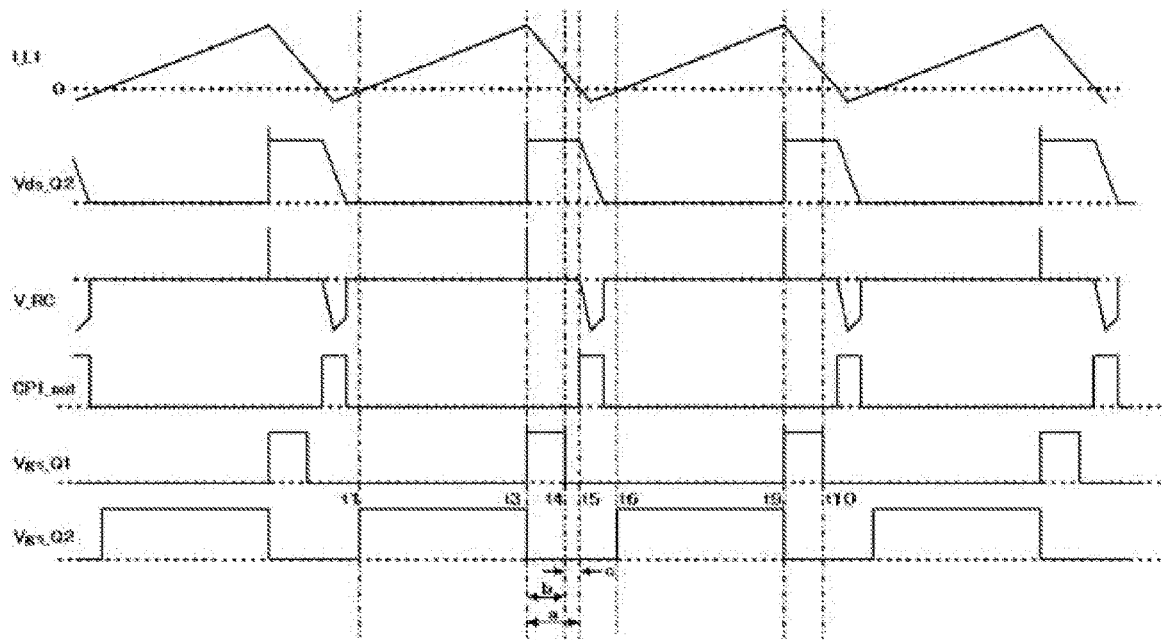
FIG. 2 is a diagram illustrating operational waveforms of each part in an Embodiment 1, such as is illustrated in FIG. 1.

Referring to FIG. 1 and FIG. 2, the overall operation of the bridgeless power factor correction circuit 1 according to one or more embodiments described below. The configuration of the embodiment includes the reactor L1, the N-channel MOSFETs Q1 and Q2, and the capacitor C3 and the resistor R1 of the differentiation circuit. Depending on the voltage polarity of the L terminal and N terminal of the AC power supply AC, either the N-channel MOSFET Q1 or the N-channel MOSFET Q2 performs an active switch operation or a synchronous rectification switch operation. For example, when the L terminal is positive and the N terminal is negative, the N-channel MOSFET Q2 becomes the active switch, the N-channel MOSFET Q1 becomes the synchronous rectification switch, the diode D2 becomes conductive, and the diode D1 turns off. When the L terminal is negative and the N terminal is positive, the N-channel MOSFET Q1 becomes the active switch, the N-channel MOSFET Q2 becomes the synchronous rectification switch, the diode D1 becomes conductive, and the diode D2 turns off.

The integrated circuit Cont1 is described. A voltage dividing signal of the series circuit of the resistors R2 and R3, which is an output voltage signal, is detected by an A/D converter A/D of the integrated circuit Cont1, and the data is sent to a calculator CAL1. The calculator CAL1 compares the voltage dividing signal with a predetermined reference voltage, which is not illustrated in the figure, and generates an ON-time signal by conducting a filtering process, etc. to an error signal between the voltage dividing signal and the predetermined reference voltage. The ON-time signal is sent to an oscillator OSC1. The oscillator OSC1 generates a pulse for the active switch and a pulse for the synchronous rectification switch from an ON time and an OFF time 1. A switch SW1 switches outputting pulses between pulses for the active switch and the synchronous rectification switch to the N-channel MOSFETs Q1 and Q2 based on an output signal from a phase detector PD1. The phase detector PD1 detects the voltage of the L terminal of the AC power supply AC, determines the polarity of the positive pole or negative pole, and sends a signal according to the decision to the switch SW1, an edge detector ED2, and a reference voltage Vrm. A voltage waveform at the connection point between the capacitor C3 and the resistor R1 in the differentiation circuit is input to the RC terminal and input to a non-inverted terminal of a comparator CP1 via a resistor Rc1. A resistor Rc2 and a reference voltage Vrp are connected between the non-inverted terminal and GND, and the reference voltage Vrm is connected to an inverted terminal. In this way, the comparator CP1 has two input terminals, each of which is DC superimposed, detects the polarity of a signal of the differentiation circuit, and sends a signal to an edge detector ED2. The reference voltage Vrm is switched either to a value H, which is higher than a reference voltage Vr, or a value L, which is lower than the reference voltage Vr, based on an output signal of the phase detector PD1. For example, when the voltage of the L terminal of the AC power supply AC is positive, the reference voltage Vrm is switched to the value H; and when the voltage of the L terminal of the AC power supply AC is negative, the reference voltage Vrm is switched to the value L. As a result, the voltage waveform of the differentiation circuit may be detected via the RC terminal if the waveform's polarity is a charge direction or a discharge direction of the capacitor C3. The reason for switching the reference voltage Vrm based on the voltage polarity of the L terminal of the AC power supply AC is that the N-channel MOSFET (hereinafter, may be referred simply to as "NMOSFET") Q2 connected in parallel with the differentiation circuit is switched to the active switch or the synchronous rectification switch. When the NMOSFET Q2 is the active switch mode, the timing of the discharge of the capacitor C3 in the differentiation circuit is detected, and it is detected that the current flowing in the reactor L1 reaches zero. When the NMOSFET Q2 is the synchronous rectification switch mode, the timing of the charge of the capacitor C3 in the differentiation circuit is detected, and it is detected that the current flowing in the reactor L1 reaches zero. The edge detector ED2 processes a signal from the comparator CP1 into a trigger pulse and sends the signal to a Timer as a stop signal. Since the reference voltage Vrm is on the value H side or the value L side according to the voltage polarity of the L terminal of the AC power supply AC, the output of the comparator CP1 is an output signal of either a down edge of H→L or an upper edge of L→H. The edge detector ED2 may detect the signal of the comparator CP1 correctly by switching between the upper edge and the down edge from the signal of the phase detector PD1.

The Timer is started by the down edge of the active switch pulse of the oscillator OSC1. The Timer may be started by using the upper edge of the synchronous rectification switch pulse of the oscillator OSC1. The Timer receives a start signal from the oscillator OSC1 and a stop signal from the edge detector ED2 and measures the reset time of the current flowing in the reactor L1. The measurement data of the Timer is sent to the oscillator OSC1, in which the sent value is a slightly shorter than the original value by subtracting a predetermined constant via a constant device CD1. In other words, the measured data of the Timer is the basis for the ON time of the synchronous rectification switch.

The operation of the power factor correction circuit is explained. In FIG. 1, the L terminal is positive, and the N terminal is negative. The waveforms are also illustrated under the same conditions as FIG. 1 in FIG. 2. The voltage dividing signal of the series circuit of the resistors R2 and R3 is detected by the A/D convertor ND, and the data is sent to the calculator CAL2. The calculator CAL1 compares the voltage dividing signal with the predetermined reference voltage, which is not illustrated in the figure, based on the voltage dividing signal and generates the ON-time signal by conducting a filtering process, etc. to the error signal between the voltage dividing signal and the predetermined reference voltage. The ON-time signal is sent to the oscillator OSC1. The oscillator OSC1 outputs an active switch signal based on the ON-time signal and sends a synchronous rectification switch signal based on the OFF time1 from the constant device CD1 to the switch SW1. Based on the output signal of the phase detector PD1, the switch SW1 outputs an on-pulse signal Vgs_Q2 of the active switch to the NMOSFET Q2 and outputs a synchronous rectification switch pulse signal Vgs_Q1 to the NMOSFET Q1. With the NMOSFET Q2 turned on, the peak current of a reactor current IL1 that flows into the reactor L1 is determined based on the input voltage to be applied to the reactor L1, that is, based on a rectified voltage of the AC power supply AC and the on-pulse signal Vgs_Q2.

Although the transient response becomes a little slower, the pulse width of the on-pulse signal Vgs_Q2 is set to constant in a period of half a cycle or more of a commercial frequency of the AC power supply AC, so that the reactor current IL1 flowing into the reactor L1 contains the peak current depending on the input voltage. Therefore, the peak current waveform is similar to the input voltage. Based on a V_RC waveform, in which a drain-source voltage Vds_Q2 in FIG. 2 is detected by the differentiation circuit, a pulse CP1_out is generated by the comparator CP1 at a time t5, and a stop signal is sent to the Timer via the edge detector ED2. The OFF time 1 is sent to the oscillator OSC1 via the constant device CD1 from the Timer, then the next ON trigger of the active switch is applied at a time t6. The time t5 is the time when the drain-source voltage Vds_Q2 of the active switch begins to decrease and the reactor current IL1 flowing into the reactor L1 reaches zero.

Note that there is a delay period between the time when the pulse CP1_out of the comparator CP1 is completed and the time when the next active switch is turned on, but a regenerative current of the reactor L1 flows into the AC power supply side during the period; therefore, the reactor current IL1 is not interrupted. Thus, the reactor current IL1 flowing in the reactor L1 may be controlled to be on in the critical mode. Also, since the peak current of the reactor current IL1 is similar to the input voltage, the average value of the reactor current IL1, i.e., the input current waveform of the AC power supply AC is similar to the input voltage; therefore, the power factor is improved, which may obtain a sufficient value to meet the harmonic standards.

Approximately at the same time of a time t3 when the on-pulse signal Vgs_Q2 of the active switch is turned off, the on-pulse signal Vgs_Q1 of the synchronous rectification switch is output, and the N-channel MOSFET Q1 of the synchronous rectification switch turns on. Then, the reactor current IL1 of the reactor L1 flows to the output smoothing capacitor C2 via the synchronous rectification switch (or a parasitic diode of the N-channel MOSFET Q1).

Figure 3:
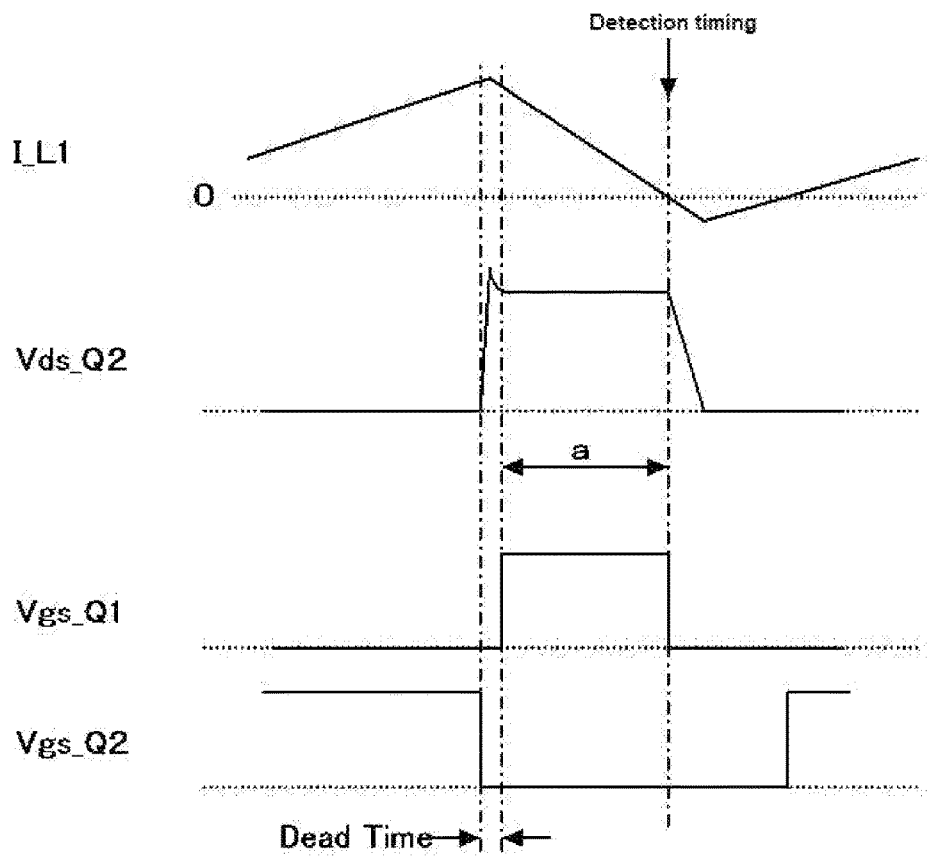
FIG. 3 is a diagram illustrating ideal operating waveforms of a bridgeless power factor correction circuit, such as in an Embodiment 1.
Figure 4:
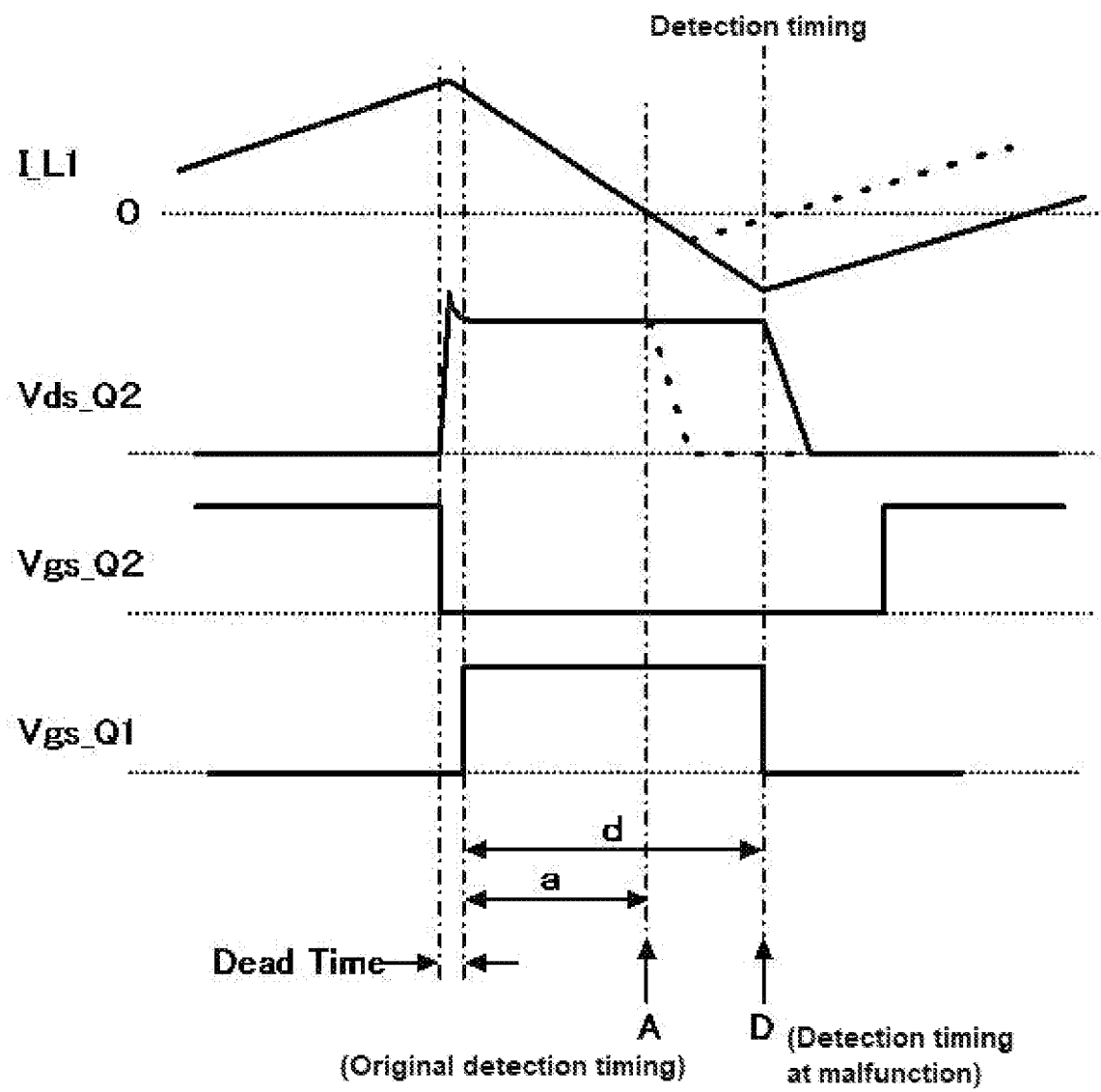
FIG. 4 is a diagram illustrating operating waveforms of a bridgeless power factor correction circuit when a detection timing of an ON signal is delayed.

For a period a, in which the energy stored in the reactor L1 is discharged illustrated in FIG. 3, the period of which the on-pulse signal Vgs_Q1 of the synchronous rectification switch N-channel MOSFET Q1 is turned on is shortened by a period c shown in FIG. 2. The reason is that the OFF time 1, which is shortened data and is obtained by subtracting a predetermined constant (equivalent to the period c shown in FIG. 2) from the data of the OFF time 2 generated by the Timer by the constant device CD1, is sent to the oscillator OSC1. It may be ideal that the synchronous rectification switch N-channel MOSFET Q1 is ON for the entire period a. However, as illustrated in FIG. 4, malfunctions due to noise or sudden changes in the input voltage may extend the on-state of the synchronous rectification switch beyond the period a. The period a is measured by the Timer each time, and the result is assigned to the next on-pulse time of the synchronous rectification switch N-channel MOSFET Q1 as a reference value (time t9 to time t10 shown in FIG. 2).

However, for the above reason, as illustrated in FIG. 2, the on-pulse signal Vgs_Q1 of the synchronous rectification switch N-channel MOSFET Q1 generates a period b (time t3 to time t4) that is shorter than the period a by a predetermined period c, to make sure to measure the period a from the differentiation circuit. The synchronous rectification switch is in the off-state at a predetermined period c (time t4 to time t5), but the reactor current IL1 flows via the synchronous rectification switch, i.e., the parasitic diode of the N-channel MOSFET Q1 during the time. Therefore, the loss for the forward voltage of the parasitic diode occurs, but the current value of the reactor current IL1 falls down to zero ampere, which is not a big loss.

As illustrated in FIG. 3, a predetermined dead time is provided between the time when the on-pulse signal Vgs_Q2 of the active switch N-channel MOSFET Q2 is turned off and the time when the on-pulse signal Vgs_Q1 of the synchronous rectification switch N-channel MOSFET Q1 is turned on to avoid both the active switch N-channel MOSFET Q2 and the synchronous rectification switch N-channel MOSFET Q1 being in the on-state at the same time and causing a short circuit.

FIG. 2 illustrates waveforms under the condition that the L terminal of the AC power supply AC is positive and the N terminal of the AC power supply AC is negative. However, when the polarities of the L terminal and the N terminal are reversed, the same operation is performed by switching the active switch to the N-channel MOSFET Q1 and the synchronous rectification switch to the N-channel MOSFET Q2 via the switches SW1 and SW2 according to the signal of the phase detector PD1. Since the V_RC waveform in the differentiation circuit is inverted from a negative waveform to a positive waveform, the reference voltage Vrm is switched to a lower value L to the reference voltage Vr to obtain the CP1_out pulse according to the signal of the phase detector PD1.

Embodiment 2

Figure 5:
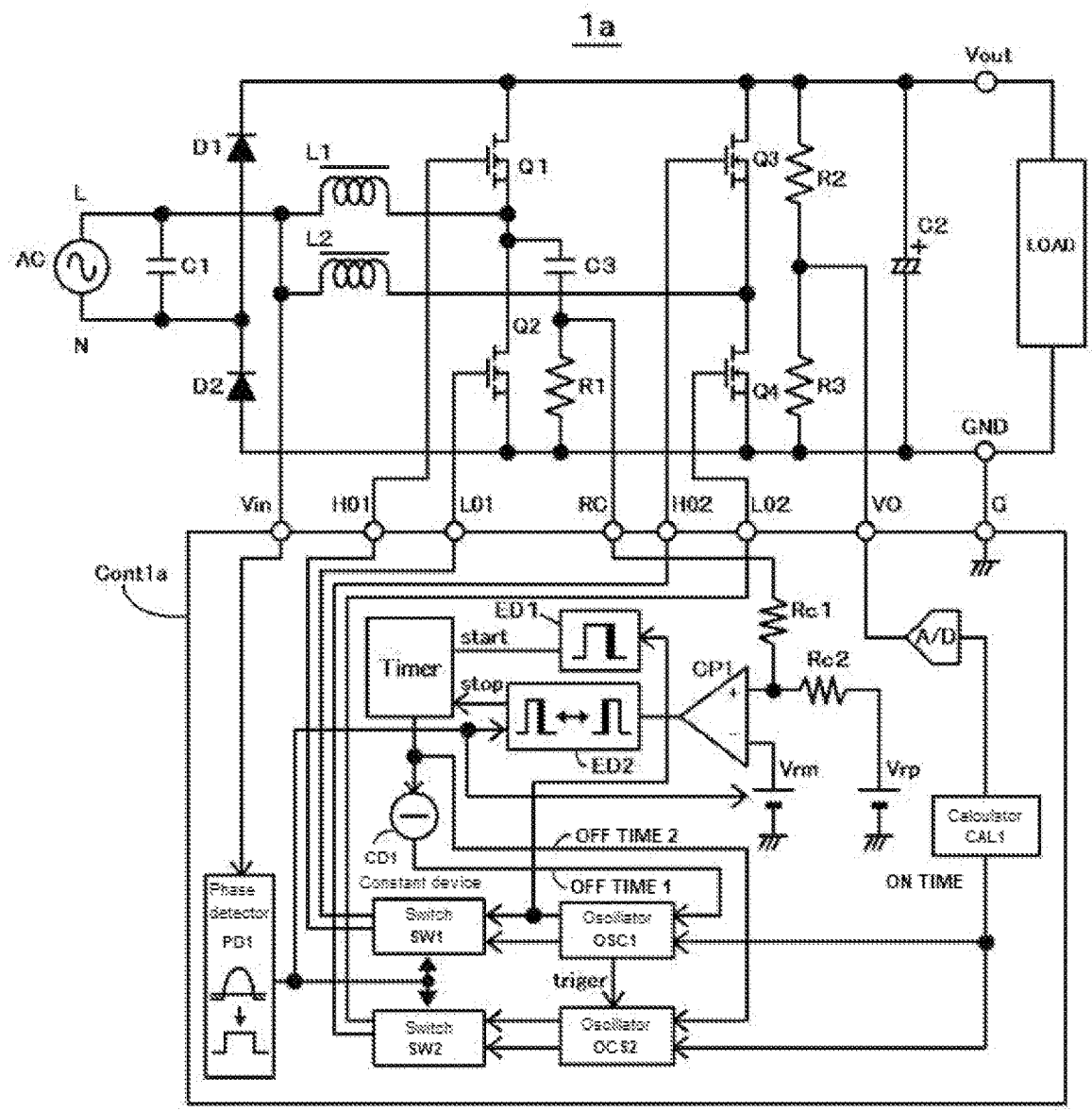
FIG. 5 is a configuration diagram illustrating a bridgeless interleaved power factor correction circuit according to one or more embodiments, such as in an Embodiment 2.

FIG. 5 is a diagram illustrating a bridgeless interleaved power factor correction circuit in a critical mode according to Embodiment 2. In FIG. 5, a bridgeless interleaved power factor correction circuit includes diodes D1 and D2, a first reactor L1, a second reactor L2, N-channel MOSFETs Q1 to Q4, a resistor R1 and a capacitor C3 that form a differentiation circuit, an output smoothing capacitor C2, output voltage detection resistors R2 and R3, and an integrated circuit Cont1a that includes circuits with various functions. In a bridgeless interleaved power factor correction circuit 1a in a critical mode according to one or more embodiments, a capacitor C1 for noise reduction is connected between both ends of an L terminal and an N terminal of an AC power supply AC, and one end of the first reactor L1 and one end of the second reactor L2 are connected to the L terminal side. A connection point of a series circuit of the diodes D1 and D2 is connected to the N terminal side of the AC power supply AC, a cathode of the diode D1 is connected to a positive pole of an output voltage, and an anode of the diode D2 is connected to a negative pole of the output voltage, i.e., GND. Half-bridge circuits of the N-channel MOSFETs Q1 and Q2 and of N-channel MOSFETs Q3 and Q4, and the series circuit of the resistors R2 and R3 to detect the output voltage are connected between both terminals of the series circuit of the diodes D1 and D2.

The other terminal of the first reactor L1 is connected to the connection point between the N-channel MOSFETs Q1 and Q2, and the other terminal of the second reactor L2 is connected to the connection point between the N-channel MOSFETs Q3 and Q4. The capacitor C3 and the resistor R1 of the differentiation circuit are connected between the connection point of the N-channel MOSFETs Q1 and Q2 and the anode of the diode D2, i.e., GND. In the integrated circuit Cont1a, the L terminal of the AC power supply AC is connected to a Vin terminal, gate terminals of the N-channel MOSFETs Q1, Q2, Q3 and Q4 are connected to H01, L01, H02, and L02 terminals, respectively, the connection point of the capacitor C3 and the resistor R1 of the differentiation circuit is connected to an RC terminal, and the connection point between the resistors R2 and R3 of the series circuit for detecting output voltage is connected to a VO terminal.

Figure 6:
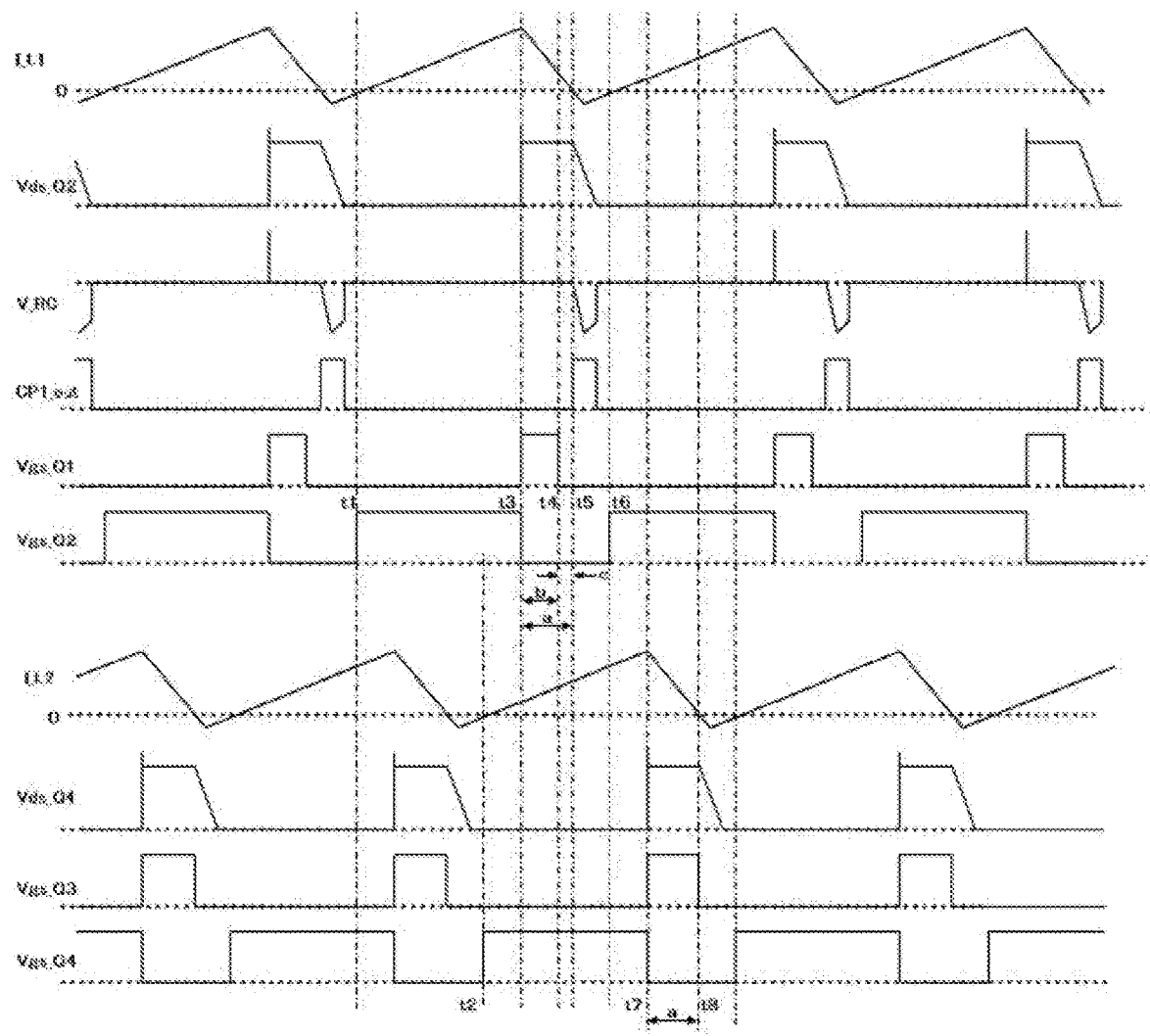
FIG. 6 is a diagram illustrating operational waveforms of each part in an Embodiment 2, such as is illustrated in FIG. 5.

Referring to FIG. 5 and FIG. 6, an overall operation of the bridgeless interleaved power factor correction circuit 1a according to one or more embodiments is described below. The bridgeless interleaved power factor correction circuit 1a comprises a master circuit, which includes the first reactor L1, the N-channel MOSFETs Q1 and Q2, and the capacitor C3 and the resistor R1 of the differentiation circuit, and a slave circuit, which includes the second reactor L2 and the N-channel MOSFETs Q3 and Q4. The phase difference between switching cycles of the master circuit and the slave circuit is set to 180 degrees, and the master circuit and the slave circuit are controlled to be on and off by the integrated circuit Cont1a to reduce the output ripple voltage.

Depending on the voltage polarity of the L terminal and the N terminal of the AC power supply AC, the N-channel MOSFETs Q1, Q2, Q3, and Q4 conduct operations of either the active switch or the synchronous rectification switch. For example, when the L terminal is positive and the N terminal is negative, the N-channel MOSFETs Q2 and Q4 become active switches, the N-channel MOSFETs Q1 and Q3 become synchronous rectification switches, the diode D2 conducts, and the diode D1 turns off. When the L terminal is negative and the N terminal is positive, the N-channel MOSFETs Q2 and Q4 become synchronous rectification switches, the N-channel MOSFETs Q1 and Q3 become active switches, the diode D1 conducts, and the diode D2 turns off.

The configuration and functions of the integrated circuit Cont1a are described. A voltage dividing signal of the series circuit of the resistors R2 and R3, which is an output voltage signal, is detected by an AD converter ND in the integrated circuit Cont1a, and the data is sent to a calculator CAL1. Based on the voltage dividing signal, the calculator CAL1 compares the data with a predetermined reference voltage, which is not illustrated in the figure, and generates an ON-time signal by conducting a filtering processing, etc. to an error signal between the voltage dividing signal and the predetermined reference voltage. The ON-time signal is sent to oscillators OSC1 and OSC2. The oscillator OSC1 is for the master circuit (N-channel MOSFETs Q1 and Q2), and the oscillator OSC2 is for the slave circuit (N-channel MOSFETs Q3 and Q4).

The oscillator OSC1 generates an active switch pulse and a synchronous rectification switch pulse for the master circuit from the ON time and the OFF time 1. The oscillator OSC1 also outputs a trigger pulse to the oscillator OSC2. The oscillator OSC2 generates an active switch pulse and a synchronous rectification switch pulse for the slave circuit from the ON time and an OFF time 2. Also, the oscillator OSC2 delays the phase of an output pulse by 180 degrees compared to the oscillator OSC1 based on the trigger pulse received from the oscillator OSC1.

The switch SW1 switches output between the active switch pulse and the synchronous rectification switch pulse for the master circuit received from the oscillator OSC1 to the N-channel MOSFETs Q1 and Q2 based on the output signal of the phase detector PD1. Similarly, a switch SW2 switches output between the active switch pulse and the synchronous rectification switch pulse for the slave circuit received from the oscillator OSC2 to the N-channel MOSFETs Q3 and Q4 based on the output signal of the phase detector PD1. The phase detector PD1 detects the voltage at the L terminal of the AC power supply AC, determines the polarity of positive or negative poles, and outputs a signal to the switch SW1, the switch SW2, the edge detector ED2, and the reference voltage Vrm according to the input polarity.

A voltage waveform at the connection point between the capacitor C3 and the resistor R1 in the differentiation circuit is input to the RC terminal and is input to the non-inverted terminal of the comparator CP1 via a resistor Rc1. A resistor Rc2 and the reference voltage Vrp are connected between the non-inverted terminal and GND, and the reference voltage Vrm is connected to the inverted terminal. In this way, the comparator CP1 has two input terminals, each of which is DC superimposed, detects the polarity of the signal of the differentiation circuit, and sends a signal to the edge detector ED2.

The reference voltage Vrm is switched either to the value H, which is higher than the reference voltage Vr, or the value L, which is lower than the reference voltage Vr, based on an output signal of the phase detector PD1. For example, when the voltage of the L terminal of the AC power supply AC is positive, the reference voltage Vrm is switched to the value H side; and when the voltage of the L terminal of the AC power supply AC is negative, the reference voltage Vrm is switched to the value L side. As a result, the voltage waveform of the differentiation circuit may be detected via the RC terminal if the waveform's polarity is a charge direction or a discharge direction of the capacitor C3.

The reason for switching the reference voltage Vrm based on the voltage polarity of the L terminal of the AC power supply AC is that the NMOSFET Q2 connected in parallel with the differentiation circuit is switched to the active switch or the synchronous rectification switch. When the NMOSFET Q2 is the active switch mode, the timing of the discharge of the capacitor C3 in the differentiation circuit is detected, and it is detected that the current flowing in the reactor L1 reaches zero. When NMOSFET Q2 is the synchronous rectification switch mode, the timing of the charge of the capacitor C3 in the differentiation circuit is detected, and it is detected that the current flowing in the reactor L1 reaches zero.

The edge detector ED2 processes a signal from the comparator CP1 into a trigger pulse and sends the signal to the Timer as a stop signal. Since the reference voltage Vrm is on the value H side or the value L side according to the voltage polarity of the L terminal of the AC power supply AC, the output of the comparator CP1 is the output signal of either the down edge of H→L or the upper edge of L→H. The edge detector ED2 may detect the signal of the comparator CP1 correctly by switching between the upper edge and the down edge from the signal of the phase detector PD1. The Timer is started by the down edge of the active switch pulse of the oscillator OSC1. The Timer may be started by using the upper edge of the synchronous rectification switch pulse of the oscillator OSC1. The Timer receives a start signal from the oscillator OSC1 and a stop signal from the edge detector ED2 and measures the reset time of the current flowing in the reactor L1. The measurement data of the Timer is directly sent to the oscillator OSC2, and a slightly shorter value, in which the predetermined constant is subtracted from the measurement data via the constant device CD1, is sent to the oscillator OSC 1. In other words, the measurement data of the Timer is the basis for the ON-time data of the synchronous rectification switch.

An operation of the bridgeless interleaved power factor correction circuit 1a in the critical mode is explained using the operation of the master circuit. FIG. 5 provides the condition of which the L terminal is positive and the N terminal is negative. FIG. 6 also illustrates waveforms under the same condition as FIG. 5. The voltage dividing signal of the series circuit of the resistors R2 and R3, which is the output voltage signal, is detected by the A/D converter ND in the integrated circuit Cont1a, and the data is sent to the calculator CAL1. Based on the voltage dividing signal, the calculator CAL1 compares the voltage dividing signal with the predetermined reference voltage, which is not illustrated in the figure, and generates the ON-time signal by conducting a filtering process, etc. to the error signal between the voltage dividing signal and the predetermined reference voltage. The ON-time signal is sent to the oscillator OSC1. The oscillator OSC1 uses the ON-time signal to output an active switch signal and outputs a synchronous rectification switch signal to the switch SW1 based on the OFF time1 from the constant device CD1. Based on the output signal of the phase detector PD1, the switch SW1 outputs the on-pulse signal Vgs_Q2 of the active switch to the NMOSFET Q2 and outputs the on-pulse signal Vgs_Q1 of the synchronous rectification switch to the NMOSFET Q1. With the NMOSFET Q2 turned on, the peak current of a reactor current IL1 that flows into the reactor L1 is determined based on the input voltage to be applied to the reactor L1, that is, based on a rectified voltage of the AC power supply AC and the on-pulse signal Vgs_Q2.

Although the transient response becomes a little slower, the pulse width of the on-pulse signal Vgs_Q2 is set to constant in a period of half a cycle or more of the commercial frequency of the AC power supply AC, so that the reactor current IL1 flowing into the reactor L1 contains the peak current depending on the input voltage. Therefore, the peak current waveform is similar to the input voltage. Based on the V_RC waveform, in which the drain-source voltage Vds_Q2 illustrated in FIG. 6 is detected by the differentiation circuit, the pulse CP1_out is generated by the comparator CP1 at the time t5, and a stop signal is sent to the Timer via the edge detector ED2. The OFF time 1 is sent to the oscillator OSC1 via the constant device CD1 from the Timer, then the next ON trigger of the active switch is applied at the time t6. The time t5 is the time when the drain-source voltage Vds_Q2 of the active switch begins to decrease and the reactor current IL1 flowing into the reactor L1 reaches zero. Note that there is a delay period between the time when the pulse CP1_out of the comparator CP1 is completed and the time when the next active switch is turned on, but the regenerative current of the reactor L1 flows into the AC power supply side during the period; therefore, the reactor current IL1 is not interrupted.

Thus, the reactor current IL1 flowing in the reactor L1 may be controlled to be on in the critical mode. Also, since the peak current of the reactor current IL1 is similar to the input voltage, the average value of the reactor current IL1, i.e., the input current waveform of the AC power supply AC is similar to the input voltage; therefore, the power factor is improved, which may obtain a sufficient value to meet the harmonic standards.

Approximately at the same time of the time t3 when the on-pulse signal Vgs_Q2 of the active switch is turned off, the on-pulse signal Vgs_Q1 of the synchronous rectification switch is output, and the N-channel MOSFET Q1 of the synchronous rectification switch turns on. Then, the reactor current IL1 of the reactor L1 flows to the output smoothing capacitor C2 via the synchronous rectification switch (or a parasitic diode of the N-channel MOSFET Q1). For the period a, in which the energy stored in the reactor L1 is discharged illustrated in FIG. 3, the period of which the on-pulse signal Vgs_Q1 of the synchronous rectification switch N-channel MOSFET Q1 is turned on is shortened by the period c. The reason is that the OFF time 1, which is shortened data and is obtained by subtracting the predetermined constant (equivalent to the period c shown in FIG. 2) from the data of the OFF time 2 generated by the Timer by the constant device CD1, is sent to the oscillator OSC1.

It may be ideal that the synchronous rectification switch N-channel MOSFET Q1 is ON for the entire period a. However, as illustrated in FIG. 4, malfunctions due to noise or sudden changes in the input voltage may extend the on-state of the synchronous rectification switch beyond the period a. The period a is measured by the Timer each time, and the result is assigned to the on-pulse time of the synchronous rectification switch N-channel MOSFET Q3 in the slave circuit that switches following the master circuit (time t7 to time t8 shown in FIG. 6). Therefore, the result is utilized as a reference value for the next on-state period of the synchronous rectification switch.

For the above reason, as illustrated in FIG. 6, the on-pulse signal Vgs_Q1 of the synchronous rectification switch N-channel MOSFET Q1 generates the period b (time t3 to time t4) that is shorter than the period a by the predetermined period c to make sure to measure the period a from the differentiation circuit. The synchronous rectification switch in the master circuit is in the off-state at the predetermined period c (time t4 to t5), but the reactor current IL1 flows via the synchronous rectification switch, i.e., the parasitic diode of the N-channel MOSFET Q1 during the time. Therefore, the loss for the forward voltage of the parasitic diode occurs, but the current value of the reactor current IL1 falls down to zero ampere, which is not a big loss.

As illustrated in FIG. 3, the predetermined dead time is provided between the time when the on-pulse signal Vgs_Q2 of the active switch NMOSFET Q2 is turned off and the time when the on-pulse signal Vgs_Q1 of the synchronous rectification switch NMOSFET Q1 is turned on to avoid both the active switch NMOSFET Q2 and the synchronous rectification switch NMOSFET Q1 being in the on-state at the same time and causing a short circuit.

In the slave circuit, the oscillator OSC2 generates an on-pulse signal Vgs_Q4 of the active switch N-channel MOSFET Q4, which is a pulse signal with the same width as the pulse signal Vgs_Q2 of the active switch of the master circuit, by delaying the phase difference by 180 degrees to the on-pulse signal Vgs_Q2, and outputs the on-pulse signal Vgs_Q4 via the switch SW2. (The time t2 to time t7 are equivalent to the time t1 to time t3.) An on-pulse signal Vgs_Q3 of the synchronous rectification switch is generated during the period a, which is from the time t7, at which an on-pulse signal Vgs_Q4 of the active switch N-channel MOSFET Q4 turns off, to the time t8 through the dead time by the oscillator OSC2. In the period of a, the OFF time 2 of the signal of the Timer is directly input to the oscillator OSC2, and the on-pulse signal Vgs_Q3 of the synchronous rectification switch is sent via the switch SW2.

In FIG. 6, waveforms are illustrated under the condition that the L terminal is positive and the N terminal is negative in the AC power supply AC. However, when the polarities of the L terminal and the N terminal are reversed, the same operation is performed by switching the active switches to the N-channel MOSFETs Q1 and Q3 and switching the synchronous rectification switches to the N-channel MOSFETs Q2 and Q4 via the switches SW1 and SW2 according to the signal of the phase detector PD1. Since the V_RC waveform in the differentiation circuit is inverted from a negative waveform to a positive waveform, the reference voltage Vrm is switched to the lower value L to the reference voltage Vr based on a signal of the phase detector PD1 to obtain the pulse CP1_out.

Embodiment 3

Figure 7:
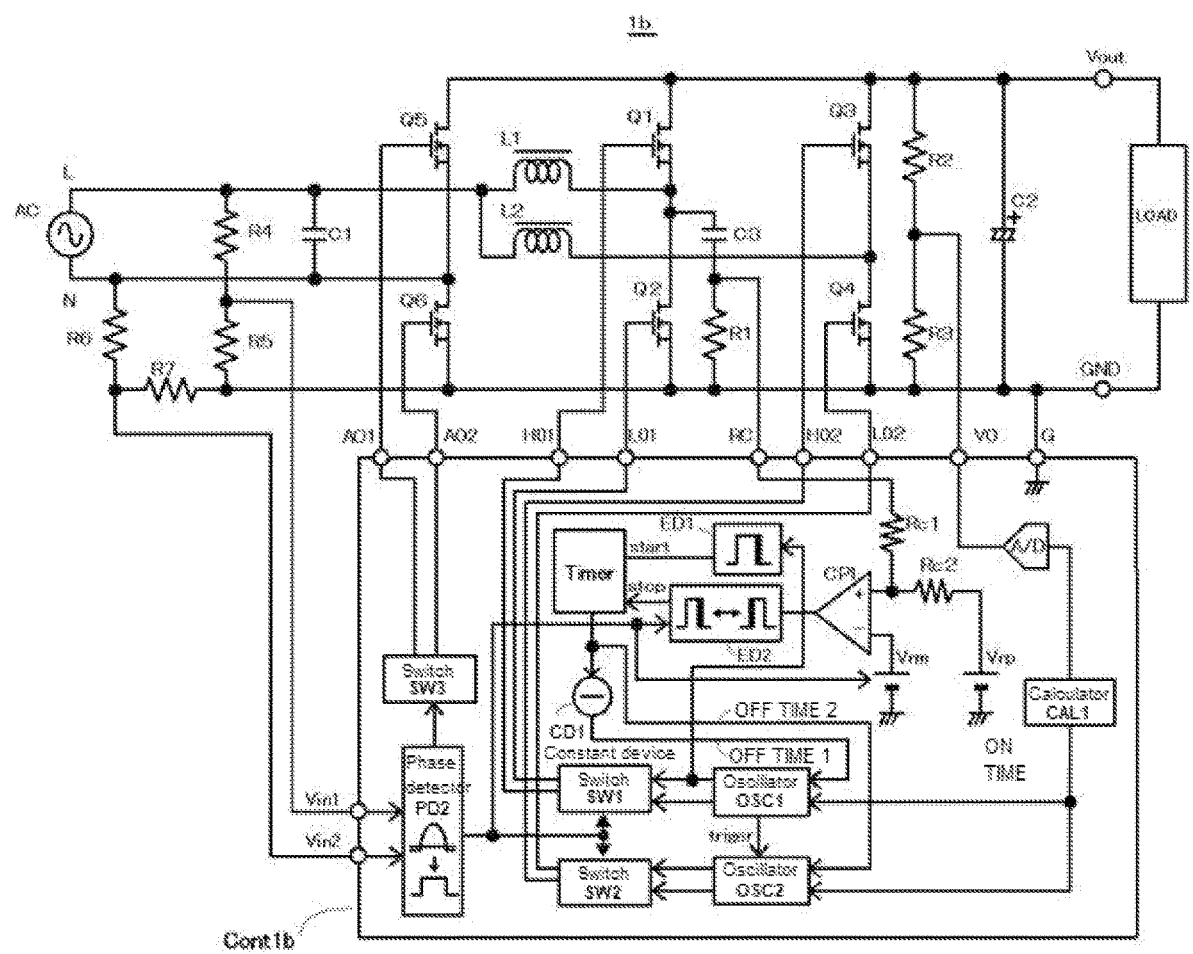
FIG. 7 is a configuration diagram illustrating a bridgeless interleaved power factor correction circuit according to one or more embodiments, such as in an Embodiment 3.
Figure 8:
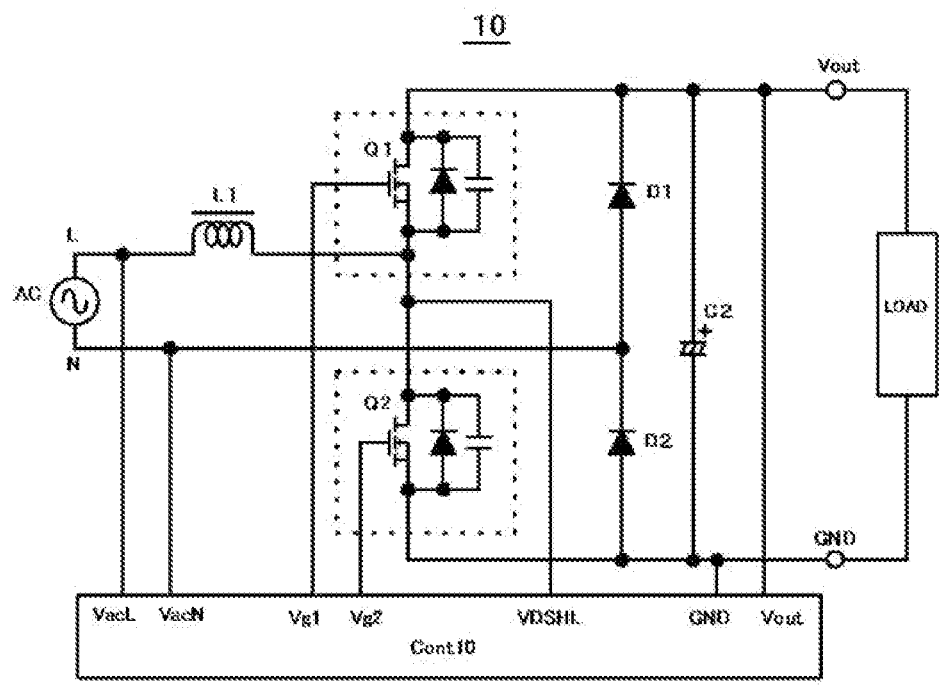
FIG. 8 is a configuration diagram illustrating a circuit of a related art.
Figure 9A:
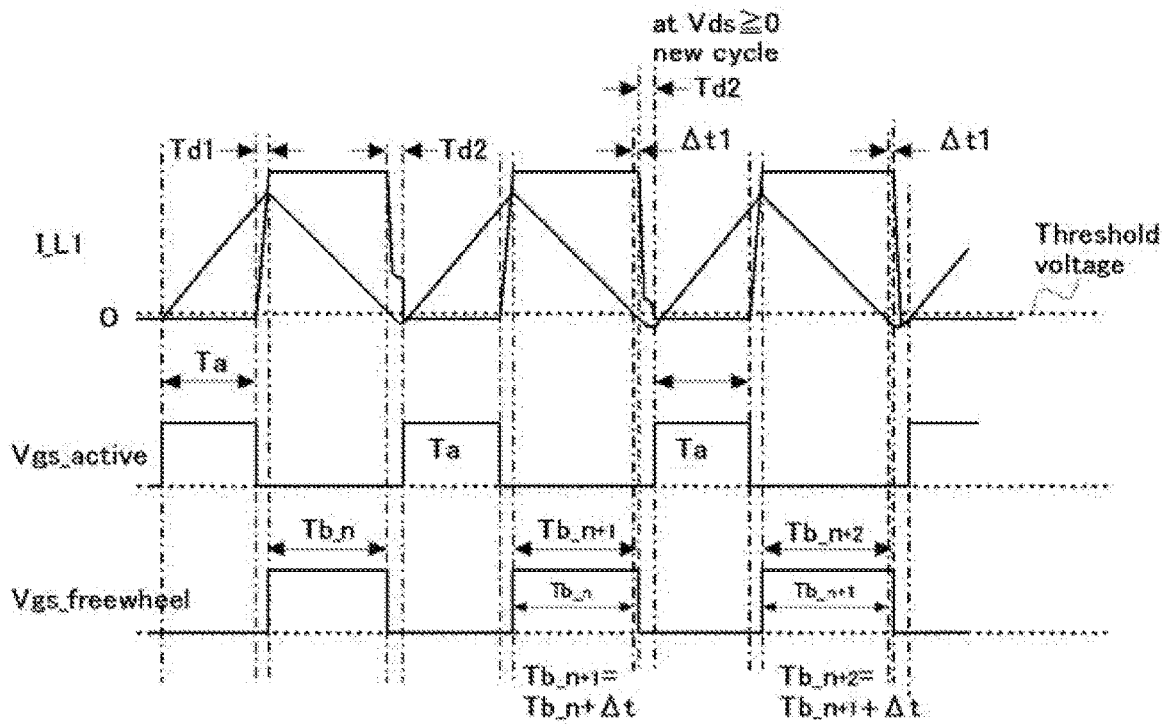
FIGS. 9A and 9B are diagrams illustrating operating principles in controlling the related art illustrated in FIG. 8.
Figure 9B:
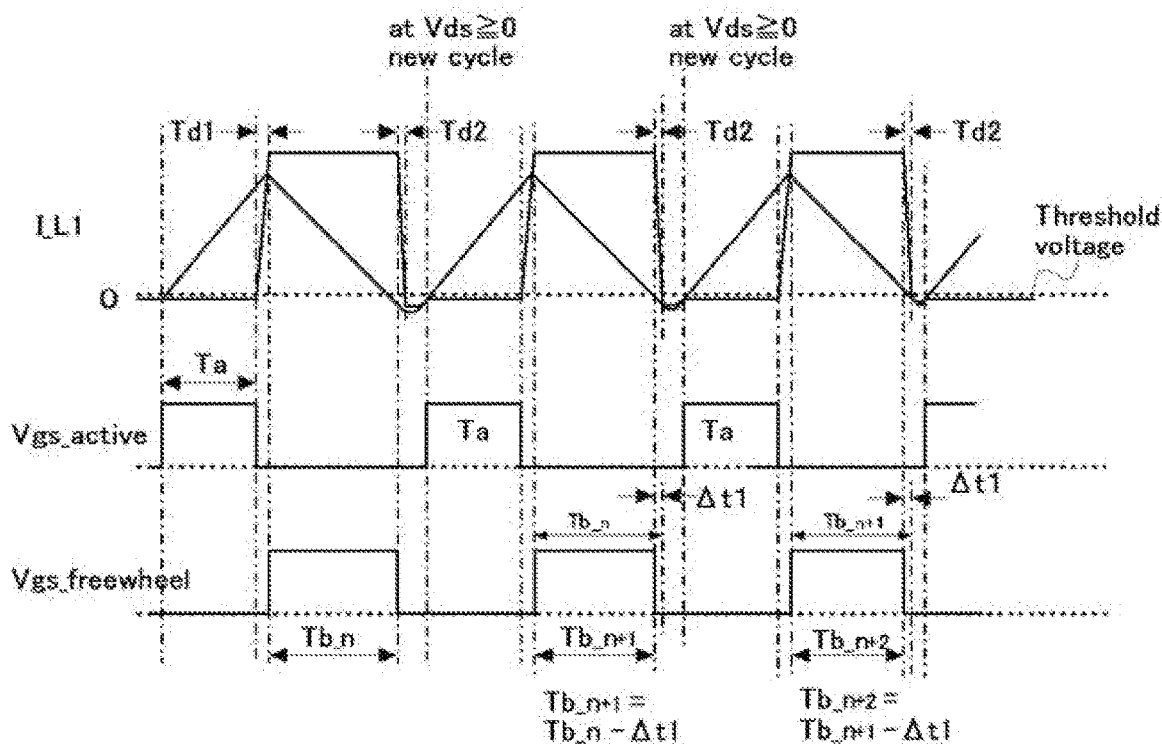

Embodiment 3, illustrated in FIG. 7, is a variation of Embodiment 2 illustrated in FIG. 5, in which the diodes D1 and D2 are replaced with N-channel MOSFETs Q5 and Q6, and other parts are the same configuration as Embodiment 2. More specifically, with replacing diodes with N-channel MOSFETs, resistors R4 to R6 to detect positive and negative polarities of the L terminal and the N terminal of the AC power supply AC are added, and the integrated circuit Cont1a is changed to an integrated circuit Cont1b. Embodiment 3 includes the N-channel MOSFETs Q5 and Q6 as switches that synchronously rectifies the commercial frequency instead of the diodes D1 and D2. The integrated circuit Cont1b outputs drive signals AO1 and AO2 so that when the L terminal of the AC power supply AC is positive, the N-channel MOSFET Q5 is turned off and the N-channel MOSFET Q6 is turned on, and when the N terminal of the AC power supply AC is positive, the N-channel MOSFET Q6 is turned off and the N-channel MOSFET Q5 is turned on.

For polarity detection of the AC power supply AC, the resistors R4 and R5 of the series resistor are connected between the L terminal and the GND, and resistors R6 and R7 of the series resistor are connected between the N terminal and the GND. The connection point of each series resistor is connected to a phase detector PD2 of the integrated circuit Cont1b. The phase detector PD2 compares the voltage with an internal reference voltage, which is not illustrated in the figure, or compares the voltage at the connection point between the series resistors to detect the polarity of the AC power supply AC.

Although the number of circuit components for detecting the positive and negative polarities of the L terminal and the N terminal of the AC power supply AC increases, the forward voltage loss of the diodes D1 and D2 is replaced by the on-resistance loss of the N-channel MOSFET, which leads to significant reduction of the power loss. Therefore, when the load power is large, the efficiency of the power factor correction circuit is increased, and a heat sink that is necessary to dissipate the heat of the diodes D1 and D2 may be removed.

The above-described embodiments are examples for embodying the technical concept of the invention, and do not specify individual configurations, combinations, etc. Each embodiment may be changed as appropriate within the scope of the technical concept of the invention. For example, the phase detectors PD1 and PD2 in Embodiment 2 and Embodiment 3 are designed to detect voltage but may be designed to detect current or detect by a capacitor coupling, etc.

In a bridgeless power factor correction circuit of a critical mode according to one or more embodiments, the ON-time of the synchronous rectification switch is set shorter than the original value, and the period of synchronous rectification is accurately detected by detecting the voltage change of the active switch, which allows a small control circuit (CPU) to control the power factor correction circuit with high conversion efficiency. In the bridgeless power factor correction circuit of the critical mode according to one or more embodiments, by using a differentiation circuit to detect the voltage change of the active switch, the impedance may be reduced without increasing the power dissipation, and a simple method without input voltage detection may be used to suppress malfunction caused by noise.

In a bridgeless interleaved power factor correction circuit in the critical mode, the ON time of the synchronous rectification switch of the master side is set shorter than the original value, and the accurate synchronous rectification period is detected by detecting the voltage change of the active switch of the master side, and the detected time is applied to the ON time of the synchronous rectification switch of the slave side, which may allow a small control circuit (CPU) to control the interleaved power factor correction circuit with high conversion efficiency.

An integrated circuit according to one or more embodiments that performs synchronous rectification control of a bridgeless power factor correction circuit in a critical mode may comprise a bridgeless power factor correction circuit of a critical mode. In the bridgeless power factor correction circuit of the critical mode, an output smoothing capacitor and a half-bridge circuit comprising a first NMOSFET and a second NMOSFET are connected between both terminals of a series circuit of a first diode and a second diode, one terminal of an AC power supply is connected to the connection point between the first diode and the second diode, and the other terminal of the AC power supply is connected to one terminal of a first reactor. The connection point of the first NMOSFET and the second NMOSFET of the half-bridge circuit is connected to the other terminal of the first reactor. A differentiation circuit comprising a capacitor and a resistor is connected between the main electrodes of the second NMOSFET of the half-bridge circuit. The integrated circuit detects the output voltage of the output smoothing capacitor, compares the output voltage with a predetermined reference voltage, and controls the half-bridge circuit to be on and off based on the error signal between the output voltage and the predetermined reference voltage. The next ON time of a synchronous rectification switch operation of the half-bridge circuit is assigned based on time that subtracting a predetermined time from a measured time, which is measured a period between OFF timing of an active switch of the half-bridge circuit and output of a differentiation signal generated by the differentiation circuit.

An integrated circuit according to one or more embodiments that performs synchronous rectification control of a bridgeless interleaved power factor correction circuit in a critical mode may comprise a bridgeless interleaved power factor correction circuit in a critical mode. In the bridgeless interleaved power factor correction circuit in the critical mode, an output smoothing capacitor, a first half-bridge circuit comprising a first NMOSFET and a second NMOSFET on a master side, and a second half-bridge circuit comprising a third NMOSFET and a fourth NMOSFET on a slave side are connected between both terminals of a series circuit of a first diode and a second diode. One terminal of an AC power supply is connected to the connection point of between the first diode and the second diode. One terminal of a first reactor and one terminal of a second reactor are connected to the other terminal of the AC power supply. The other terminal of the first reactor is connected to the connection point between the first NMOSFET and the second NMOSFET of the first half-bridge circuit. The other terminal of the second reactor is connected to the connection point between the third NMOSFET and the fourth NMOSFET of the second half-bridge circuit. A differentiation circuit comprising a capacitor and a resistor is connected between the main electrodes of the second NMOSFET of the first half-bridge circuit. The integrated circuit detects the output voltage of the output smoothing capacitor, compares the output voltage with a predetermined reference voltage, and controls the first half-bridge circuit and the second half-bridge circuit to be on and off based on the error signal between the output voltage and the predetermined reference voltage. The ON time of a synchronous rectification switch operation of the first half-bridge circuit is assigned to the next ON time of the synchronous rectification switch operation of the second half-bridge circuit by measuring a period between OFF timing of an active switch of the first half-bridge circuit and output of a differentiation signal generated by the differentiation circuit.

One or more integrated circuits that perform synchronous rectification control of a bridgeless interleaved power factor correction circuit in a critical mode may comprise a bridgeless interleaved power factor correction circuit in a critical mode. In the bridgeless interleaved power factor correction circuit in the critical mode, a first half-bridge circuit comprising a first NMOSFET and a second NMOSFET on the master side, a second half-bridge circuit comprising a third NMOSFET and a fourth NMOSFET on the slave side, a third half-bridge circuit comprising a fifth NMOSFET and a sixth NMOSFET to synchronously rectify the AC voltage of the AC power supply, and an output smoothing capacitor are connected in parallel. One terminal of the AC power supply is connected to the connection point between the fifth NMOSFET and the sixth NMOSFET, and the other terminal of the AC power supply is connected to one terminal of the first reactor and one terminal of the second reactor. The other terminal of the first reactor is connected to the connection point between the first NMOSFET and the second NMOSFET of the first half-bridge circuit. The other terminal of a second reactor is connected to the connection point between the third NMOSFET and the fourth NMOSFET of the second half-bridge circuit. A differentiation circuit comprising a capacitor and a resistor is connected between the main electrodes of the second NMOSFET of the first half-bridge circuit. The integrated circuit detects the output voltage of the output smoothing capacitor, compares the output voltage with a predetermined reference voltage, and controls the first half-bridge circuit and the second half-bridge circuit to be on and off based on the error signal between the output voltage and the predetermined reference voltage. The ON time of a synchronous rectification switch operation of the first half-bridge circuit is assigned to the next ON time of the synchronous rectification switch operation of the second half-bridge circuit by measuring a period between OFF timing of an active switch of the first half-bridge circuit and output of a differentiation signal generated by the differentiation circuit.

A method of performing synchronous rectification control of the bridgeless interleaved power factor correction circuit of the critical mode may comprise. In the bridgeless interleaved power factor correction circuit of the critical mode, an output smoothing capacitor, a first half-bridge circuit including a first NMOSFET and a second NMOSFET on the master side, and a second half-bridge circuit including a third NMOSFET and a fourth NMOSFET are connected between both terminals of a series circuit of a first rectifying element and the second rectifying element. One terminal of the AC power supply is connected to the connection point between the first rectifying element and the second rectifying element, and the other terminal of the AC power supply is connected to one terminal of a first reactor and one terminal of a second reactor. The other terminal of the first reactor is connected to the connection point between the first NMOSFET and the second NMOSFET of the first half-bridge circuit. The other terminal of the second reactor is connected to the connection point between the third NMOSFET and the fourth NMOSFET of the second half-bridge circuit. A differentiation circuit comprising a capacitor and a resistor is connected between the main electrodes of the second NMOSFET of the first half-bridge circuit. A control circuit detects the output voltage of the output smoothing capacitor, compares the output voltage with a predetermined reference voltage, and controls the first half-bridge circuit and the second half-bridge circuit to be on and off based on the error signal between the output voltage and the predetermined reference voltage. The ON time of a synchronous rectification switch operation of the first half-bridge circuit is assigned to the next ON time of the synchronous rectification switch operation of the second half-bridge circuit by measuring a period between OFF timing of an active switch of the first half-bridge circuit and output of a differentiation signal generated by the differentiation circuit.

In a method according to one or more embodiments, the next ON time of a synchronous rectification switch operation of the first half-bridge circuit may be calculated based on time that subtracting a predetermined time from a measured time, which is measured a period between OFF timing of an active switch of the first half-bridge circuit and output of a differentiation signal generated by the differentiation circuit.

As described above, in the synchronous rectification control of the bridgeless power factor correction circuit in the critical mode according to one or more embodiments, the control is provided in a simple way without input voltage detection. The integrated circuit according to one or more embodiments for synchronous rectification control of a power factor correction circuit is suitable for a bridgeless power factor correction circuit of the critical mode and a bridgeless interleaved power factor correction circuit of the critical mode. Therefore, the integrated circuit may be used for the power supply of LCD and OLED TVs, etc.

DESCRIPTION OF SIGNS

1: Bridgeless power factor correction circuit in critical mode
1a and 1b: Bridgeless interleaved power factor correction circuit in critical mode
AC: AC power supply
ND: AD converter
C1 and C3: Capacitor
C2: Output smoothing capacitor
CAL1: Calculator
Cont1, Cont1a, and Cont1b: Integrated circuit
CD1: Constant device
CP1: Comparator
D1 and D2: Diode
ED1 and ED2: Switch
L1 and L2: Reactor
Load: Load
OSC1 and OSC2: Oscillator
PD1 and PD2: Phase detector
Q1 to Q6: N-channel MOSFET (NMOSFET)
R1 to R7: Resistor
SW1, SW2, and SW3: Switch
Timer: Timer
Vrm, Vrp: Reference voltage

The invention claimed is:

1. An integrated circuit that performs synchronous rectification control of a bridgeless power factor correction circuit in a critical mode comprising:
a bridgeless power factor correction circuit of a critical mode comprising:
a first diode;
a second diode electrically connected in series with the first diode;
an output smoothing capacitor electrically connected to the first diode and the second diode;
an AC power supply that includes a first terminal and a second terminal and is electrically connected to the first diode and the second diode;
a first reactor that includes a first terminal and a second terminal and is connected to the second terminal of the AC power supply;
a half-bridge circuit including a first NMOSFET and a second NMOSFET, the second terminal of the first reactor electrically connected to a connection point between the first NMOSFET and the second NMOSFET; and
a differentiation circuit that comprises a capacitor and a resistor and is connected between main electrodes of the second NMOSFET in the half-bridge circuit; wherein
the integrated circuit detects an output voltage of the output smoothing capacitor, compares the output voltage with a reference voltage, and controls the half-bridge circuit to be on and off based on an error signal between the output voltage and the reference voltage, and
a next ON time of a synchronous rectification switch operation of the half-bridge circuit is assigned based on a time that is obtained by subtracting a predetermined time from a measured time comprising a period between OFF timing of an active switch of the half-bridge circuit and timing of an output of a differentiation signal generated by the differentiation circuit.

2. An integrated circuit that performs synchronous rectification control of a bridgeless interleaved power factor correction circuit in a critical mode comprising:
a bridgeless interleaved power factor correction circuit of a critical mode comprising:
a first diode;
a second diode electrically connected in series with the first diode;
an output smoothing capacitor electrically connected to the first diode and the second diode;
an AC power supply that includes a first terminal and a second terminal and is electrically connected to the first diode and the second diode;
a first reactor that includes a first terminal and a second terminal and is connected to the second terminal of the AC power supply;
a second reactor that includes a first terminal and a second terminal, is connected to the second terminal of the AC power supply, and is connected in parallel with the first reactor;
a first half-bridge circuit including a first NMOSFET and a second NMOSFET on a master side, wherein the second terminal of the first reactor is electrically connected to a connection point between the first NMOSFET and the second NMOSFET;
a second half-bridge circuit including a third NMOSFET and a fourth NMOSFET on a slave side, wherein the second terminal of the second reactor is electrically connected to a connection point between the third NMOSFET and the fourth NMOSFET; and
a differentiation circuit that includes a capacitor and a resistor and is connected between main electrodes of the second NMOSFET of the first half-bridge circuit; wherein
the integrated circuit detects an output voltage of the output smoothing capacitor, compares the output voltage with a predetermined reference voltage, and controls the first half-bridge circuit and the second half-bridge circuit to be on and off based on an error signal between the output voltage and the predetermined reference voltage,
a next ON time of a synchronous rectification switch operation of the first half-bridge circuit is assigned based on a measured time comprising a period between OFF timing of an active switch of the half-bridge circuit and timing of an output of a differentiation signal generated by the differentiation circuit.

3. The integrated circuit according to claim 2, wherein the next ON time of a synchronous rectification switch operation of the first half-bridge circuit is calculated based on a time that is obtained by subtracting a predetermined time from a measured time comprising a period between OFF timing of an active switch of the first half-bridge circuit and timing of an output of a differentiation signal generated by the differentiation circuit.

4. An integrated circuit for synchronous rectification control of a bridgeless interleaved power factor correction circuit in a critical mode comprising:
a bridgeless interleaved power factor correction circuit of a critical mode comprising:
an AC power supply including a first terminal and a second terminal;
an output smoothing capacitor connected in parallel with the AC power supply;

a first reactor that includes a first terminal and a second terminal and is connected to the second terminal of the AC power supply;

a first reactor that includes a first terminal and a second terminal and is connected to the second terminal of the AC power supply;

a second reactor that includes a first terminal and a second terminal, is connected to the second terminal of the AC power supply, and is connected in parallel with the first reactor;

a first half-bridge circuit including a first NMOSFET and a second NMOSFET on a master side, wherein the second terminal of the first reactor is electrically connected to the connection point between the first NMOSFET and the second NMOSFET;

a second half-bridge circuit including a third NMOSFET and a fourth NMOSFET on a slave side, wherein the second terminal of the second reactor is electrically connected to a connection point between the third NMOSFET and the fourth NMOSFET; and a differentiation circuit that includes a capacitor and a resistor and is connected between main electrodes of the second NMOSFET of the first half-bridge circuit; wherein the integrated circuit detects an output voltage of the output smoothing capacitor, compares the output voltage with a predetermined reference voltage, and controls the first half-bridge circuit and the second half-bridge circuit to be on and off based on an error signal between the output voltage and the predetermined reference voltage;

an ON time of a synchronous rectification switch operation of the first half-bridge circuit is assigned to a next ON time of the synchronous rectification switch operation of the second half-bridge circuit by measuring a period between OFF timing of an active switch of the first half-bridge circuit and timing of an output of a differentiation signal generated by the differentiation circuit.

5. The integrated circuit according to claim 4, wherein the next ON time of a synchronous rectification switch operation of the first half-bridge circuit is calculated based on a time that is obtained by subtracting a predetermined time from a measured time comprising a period between OFF timing of an active switch of the first half-bridge circuit and timing of an output of a differentiation signal generated by the differentiation circuit.

6. A method of performing synchronous rectification control of a bridgeless interleaved power factor correction circuit of a critical mode comprising:

detecting an output voltage of the output smoothing capacitor in the bridgeless interleaved power factor correction circuit of the critical mode;

converting the detected output voltage to a digital value;

comparing the converted digital value of the detected output voltage with a predetermined reference voltage to generate an ON-time signal by processing an error signal between the converted digital value of the detected output voltage;

controlling a first half-bridge circuit and a second half-bridge circuit included in the bridgeless interleaved power factor correction circuit of the critical mode to be on and off based on the ON-time signal generated by processing the error signal between the output voltage and the predetermined reference voltage;

measuring an ON time of a synchronous rectification switch operation of the first half-bridge circuit by measuring a time period between OFF timing of an active switch of the first half-bridge circuit and timing of an output of a differentiation signal generated by a differentiation circuit included in the bridgeless interleaved power factor correction circuit of the critical mode; and assigning the measured time to a next ON time of the synchronous rectification switch operation of the second half-bridge circuit.

7. The method of claim 6, wherein assigning the next ON time comprises calculating a synchronous rectification switch operation of the first half-bridge circuit based on a time that is obtained by subtracting a predetermined time from a measured time comprising a period between OFF timing of an active switch of the first half-bridge circuit and timing of an output of a differentiation signal generated by the differentiation circuit.

* * * * *